US005185992A

United States Patent [19]
Garcia

[11] Patent Number: 5,185,992
[45] Date of Patent: Feb. 16, 1993

[54] GARDEN TOOL EXPANDING ASSEMBLY

[76] Inventor: Roque P. Garcia, 400 E. Spring, Central, N. Mex. 88026

[21] Appl. No.: 746,626

[22] Filed: Aug. 19, 1991

[51] Int. Cl.[5] .......................... A01B 1/22; A01C 5/02; A01D 7/00
[52] U.S. Cl. ................................. 56/400.04; 7/116; 172/375; 403/361
[58] Field of Search ................ 56/400.04; 7/114-116, 7/167; 172/375; 403/398, 399, 378, 361

[56] References Cited

U.S. PATENT DOCUMENTS

| | | | |
|---|---|---|---|
| 684,406 | 10/1901 | Boivin | 7/116 X |
| 1,165,636 | 12/1915 | Temte | 56/400.06 |
| 1,826,038 | 10/1931 | Altenbach | 7/167 |
| 3,921,725 | 11/1975 | Trutor | 56/400.04 X |
| 4,162,132 | 7/1979 | Kress et al. | 403/361 |
| 4,214,538 | 7/1980 | Druskin et al. | 172/375 X |

Primary Examiner—Stephen J. Novosad
Attorney, Agent, or Firm—James F. Cottone

[57] ABSTRACT

A tool expanding assembly serves to greatly increase the usefulness and versatility of preexisting long-handled tools by providing a specially configured interconnecting approach which allows rapid attachment of various tool head types to the unmodified basic tool. The resulting combined tool may be rapidly reconfigured as needed, and allows the use of a wide range of tool types in groups of two, including the basic tool type and any one other of a variety of alternate tool head types. A two section tool expanding assembly is disclosed via a number of preferred embodiments, and both round and square variants of the alternate tool head interconnecting sections are presented.

19 Claims, 2 Drawing Sheets

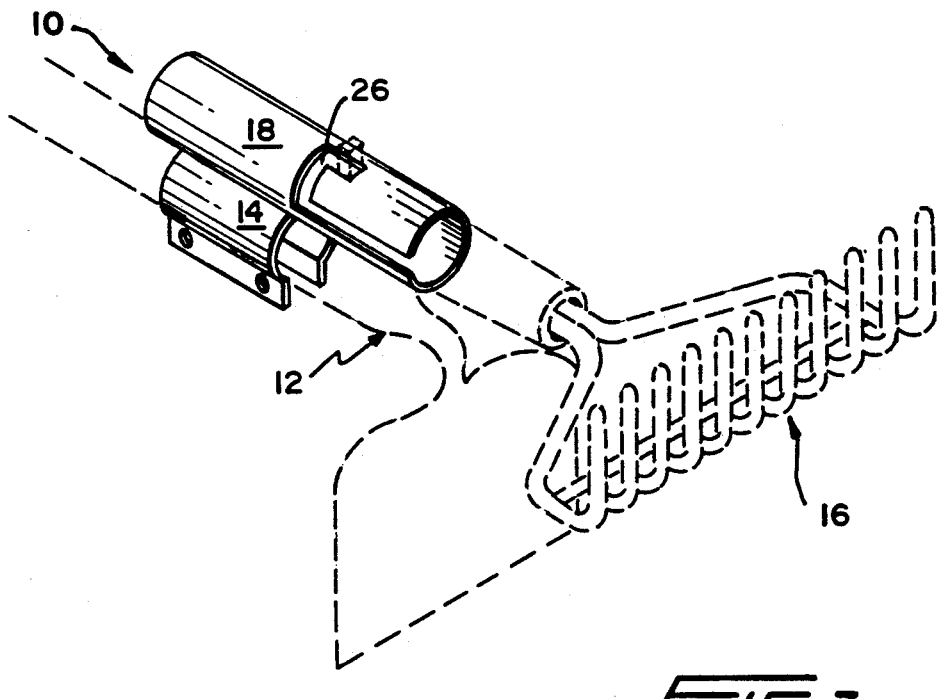
FIG_1
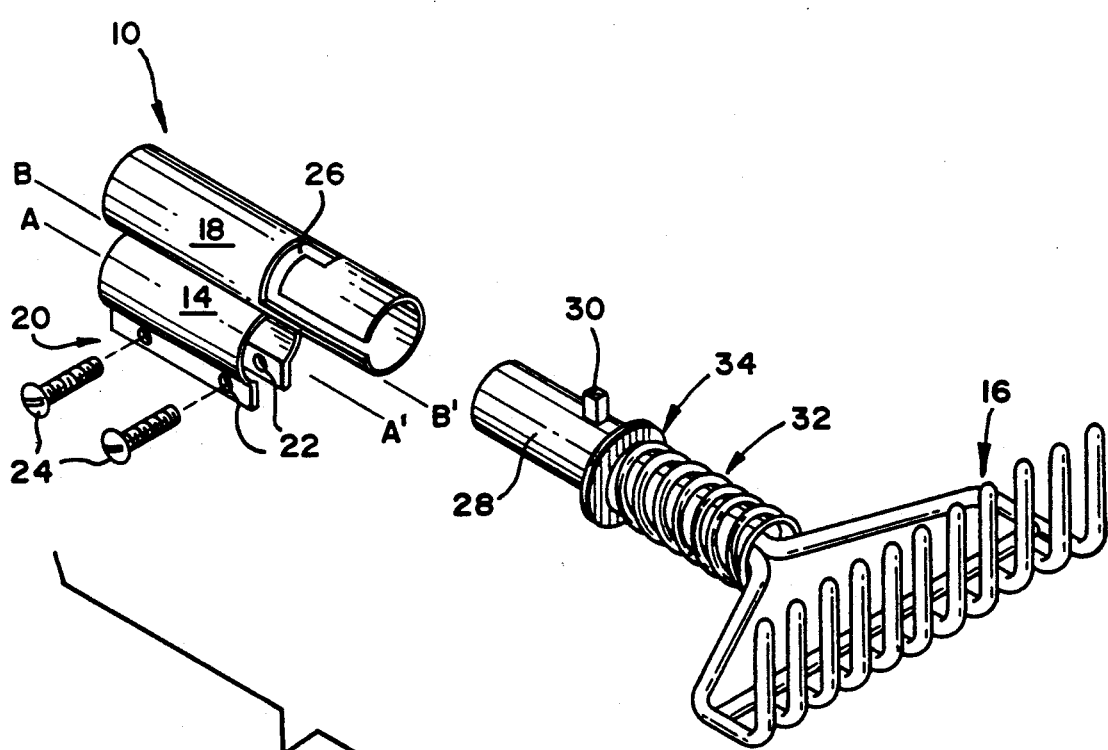
FIG_2

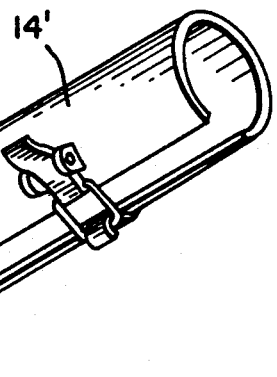
FIG_2A
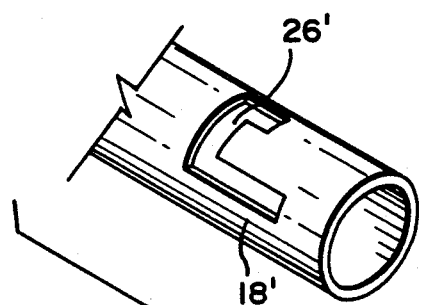
FIG_2B
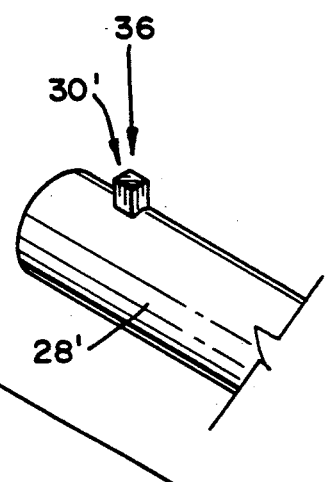
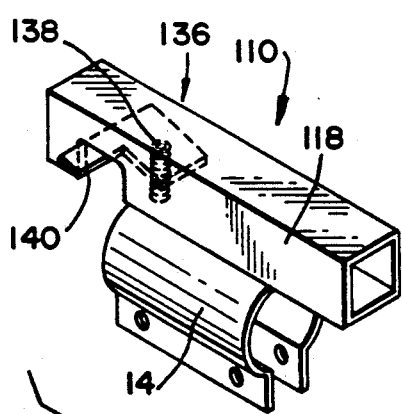
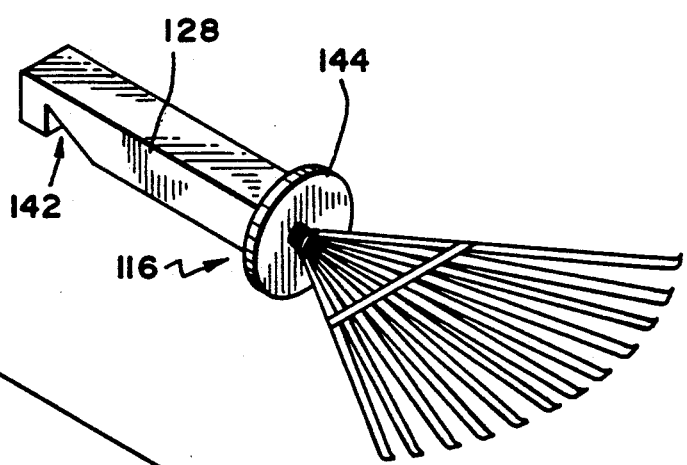
FIG_3

GARDEN TOOL EXPANDING ASSEMBLY

TECHNICAL FIELD

The present invention relates generally to methods and apparatus for expanding the versatility of handled tools, and more particularly to a tool expanding assembly which provides the means for rapidly coupling any one of a number of different tool heads to a preexisting mother tool.

BACKGROUND ART

Methods and apparatus for expanding the usefulness of hand tools by affixing alternate types of tool heads to a single tool handle have been the subject of much inventive effort over the years. The basic approach of providing multipurpose tools flows naturally from the need to apply a number of different tool heads to a workpiece—or to garden soil—serially in time. In gardening or agricultural uses, a first tool type might be used to precondition the soil, and a second tool type might occasionally be needed to rework particular areas, or to complete processes which were missed on the initial passes. The use of a long-handled hoe followed by the use of a long-handled rake to collect the debris produced by the hoe gives an example of where iterative uses of alternate tool types are commonly needed. Hence, multipurpose tools of wide varieties abound; as do devices where a number of different tool heads may be affixed to a single, specially adapted handle.

Descriptions of typical prior art approaches may be found in a number of U.S. Patents. Illustrative teachings of multipurpose gardening tools are disclosed in U.S. Pat. No. 2,793,904 to Govan, Jr., U.S. Pat. No. 4,606,089 to King, and as early as 1893 in U.S. Pat. No. 510,326 to Carman. In the 1986 King patent, there is shown an arrangement where up to five different tool heads are carried by a single, special-purpose handle, with the one desired tool head type rotated into working position from a collection of nested tool heads. The Govan, Jr., patent teaches the affixing of any one of a variety of tool head types—one at a time—to a tool handle using a spring-loaded hook and loop retaining device. The early patent to Carman teaches a simpler approach wherein tool heads are inserted into a longitudinally apertured tool handle and retained by means of a transversely positioned nut and bolt. Various types of interconnecting or quick-acting fastening means are also taught in prior U.S. Patents; with U.S. Pat. No. 2,527,256 to Jackson and U.S. Pat. No. 4,586,399 to Kassai being illustrative of round bayonet-type interconnectors and square, latch-retained interconnections respectively.

While each of these prior art approaches appears to address a particular well known need, each incorporates diverse levels of practicality both in initial fabrication as well as in subsequent usage. Therefore, there is a clear need for an improved approach to providing tool expansion methods and apparatus, and particularly for an approach where a preexisting standard tool serves as the basic unit to which alternate tool head types may be added.

SUMMARY OF THE INVENTION

It is therefore a primary object of the present invention to provide improved methods and apparatus for expanding the usefulness and versatility of handled tools (that is, a tool having a handle), and especially ones which will overcome the disadvantages of the prior art approaches. A further object of the present invention is to provide a tool expanding assembly which may be readily fitted to an existing handled tool, and which will allow a wide range of alternate tool head types to be rapidly coupled to the assembly.

A yet further object of the present invention is to provide a tool expanding assembly via a two-section device where both sections are optimized for low cost fabrication, and one section is optimized for rapid attachment to the handle of an existing handled tool, while the other section is optimized for the rapid insertion of suitably shanked alternate tool head types.

A still further object of the present invention is to provide an improved garden tool expanding method via a specially configured interconnecting device which operates in conjunction with an unmodified mother tool and one or more distinct tool head types carried by specialized mating and locking shaft members.

By means of a basic preferred embodiment and a number of alternate preferred embodiments, the present invention teaches the broad principles of an improved garden tool expanding assembly which serves to greatly increase the usefulness of a preexisting mother tool. This is done by providing means for quickly coupling alternate tool heads to the mother tool. The resulting combination tool is then capable of providing the benefits of both tool types—that of the mother tool (a hoe as shown in a basic embodiment) and that of a rake (also shown in the basic embodiment). The construction of the tool expanding assembly lends itself to quick attachment to virtually any long-handled garden tool as the mother tool, and thereafter allows the rapid coupling of a wide range of suitably terminated tool heads. The end result is a highly versatile combination which greatly increases the productivity of persons who must have ready access to a range of different tool types. Both round and square configurations are taught for the alternate tool coupling portion of the assembly, which facilitates the best use of a variety of material types, including metals, plastics, and hardwoods.

BRIEF DESCRIPTION OF THE DRAWINGS

Additional objects and advantages of the invention will become apparent to those skilled in the art as the description proceeds with reference to the accompanying drawings wherein:

FIG. 1 is a perspective view of a garden tool expanding assembly shown as coupling an auxiliary tool head to a mother tool according to the present invention;

FIG. 2 is a partially exploded perspective view of the garden tool expanding assembly showing more details of the component parts;

FIG. 2A shows a lever-actuated hook and loop fastener as an alternate fastening means used with the garden tool expanding assembly;

FIG. 2B shows an alternate configuration which may be used for the bayonet connector of the garden tool expanding assembly; and FIG. 3 is a perspective view of an alternate preferred embodiment of the garden tool expanding assembly according to the present invention.

DETAILED DESCRIPTION OF THE PREFERRED EMBODIMENTS

Referring now to FIG. 1, there is shown a basic preferred embodiment of the garden tool expanding assembly according to the present invention. The tool expanding assembly 10 is shown affixed to a mother tool 12 by means of a first quick-connect portion 14, and carries an alternate tool head 16 via a second quick-connect portion 18. Illustratively, the mother tool 12 is shown as a hoe while the alternate tool head 16 is shown as a common rake; both are depicted in phantom lines. The tool expanding assembly 10 could readily be used to interconnect other types of tool heads including various rakes, cultivators, hoes, and the like, to a similar variety of mother tools. In use, the single handle of the mother tool 12 is merely rotated 180 degrees to bring to bear which ever of the two available tool heads are called for, while the rapid substitution of alternate tool head types into the second quick-connect portion expands this choice of two tools into a virtually unlimited one. By way of a brief overview, the tool expanding assembly 10 is formed with an open sided cylinder as the first quick-connect portion 14, which is adapted to fit over and then securely grip the mother tool handle responsive to the tightening of suitable fasteners. A cylindrical tube which is permanently secured to the open-sided cylinder along a longitudinal line serves as the second quick-connect portion 18 by virtue of a female bayonet coupling means formed into one end.

By reference now to FIG. 2, the tool expanding assembly 10 more specifically comprises a pair of cylinder-like portions 14 and 18 which may be fabricated from sturdy, rust-proof metals. To help in the following descriptions, a primary longitudinal axis of the tool expanding assembly 10 is defined by the line A-A' which is centrally located within the first quick-connect portion 14. The A end of the longitudinal axis is directed toward the tool user, and the A' end of the longitudinal axis is directed toward the tool head. The two cylinder-like portions are rigidly connected together along a mating line B-B', which runs parallel to the longitudinal axis A-A', by any well known process such as by spot welding. Spot welding areas (not shown) may be distributed along the line B-B'. The open sided cylinder 14 (alternately called the first quick-connect portion 14) includes a pair of flange members 20 formed into a longitudinal opening in its wall at the side furthest away from the line B-B'. Each flange member 20 may include one or more openings 22 through which various types of fasteners, such as the bolts 24, are passed. In use, the first quick-connect portion 14 is fitted over the handle of the mother tool and the fasteners are tightened to securely grip it. Alternate fastening means such as lever actuated, hook and loop devices shown generally in FIG. 2A, may be used in lieu of the conventional nut and bolt approach. Further alternate fastening means may include variously positioned hose clamps (not shown), and the like. All that is required of the fastening means is that it firmly urge the longitudinal opening between the flanges 20, or their equivalents, to close; and thereafter to firmly retain the walls of the first quick-connect portion 14 securely around the mother tool handle in compression. Brief reference to FIG. 1 shows the preferred orientation and location of the first quick-connect portion 14 on the handle of the mother tool 12. The cylindrical tube 18 (alternately called the second quick-connect portion 18) includes a square J-shaped bayonet connector slot 26 formed into its tool head end, which is adapted to receive corresponding male bayonet connector elements used to terminate the ends of various tool heads. The alternate tool head 16 includes a short, rounded handle portion 28, a square male bayonet pin 30, and a retaining coil spring 32 held captive beyond the pin 30 by a washer 34. In use, the second quick-connect portion 18 receives the short handle 28 within it, and the well-known bayonet action retains the two firmly interconnected under the thereafter constantly applied pressure of the retaining coil spring 32.

It is desirable for effective tool use that the interconnection between the alternate tool head 16 and the second quick-connect portion 18 be fairly rigid. To this end, preferred embodiments of the present tool expanding assembly 10 employ suitable tolerances of the several interfitting components, as well as suitable hardnesses for the materials used. Hardened steel for the cylindrical tube 18 and hardwoods, steel coated hardwoods, or solid steel for the short handle 28 have been found to produce acceptable results. Also, a second set of bayonet interlocking elements located 180° from those shown are contemplated as likely alternate embodiments where wall thickness of the second quick-connect portion 18 permit. A further alternate arrangement for the bayonet connector slot 26 is shown in FIG. 2B. Note that the modified slot 26' of FIG. 2B does not extend to the end of the cylindrical tube 18'. This necessitates a spring loaded depression of the bayonet pin 30' (as suggested by the arrow 36) for full initial engagement of the modified short handle 28' into the cylindrical tube 18'. Additional rigidity may be afforded by this alternative for thin-walled configurations of the second quick-connect portion 18'.

Referring now to FIG. 3, there is shown an alternate preferred embodiment of the present invention in the form of the tool expanding assembly 110. In this embodiment, the second quick-connect portion 18 as shown in FIGS. 1 and 2 is replaced by a square-sided tubular member 118, and the short rounded handle 28 is replaced by a square-sided shaft member 128. Functionally, the overall composite tool—in this case showing a leaf rake 116 as the alternate tool head typed affixed to the mother tool (not shown)—is used as previously described. As with the basic embodiment of FIGS. 1 and 2, the embodiment of FIG. 3 may be rapidly affixed via its first quick-connect portion 14 to virtually any type of mother tool, and may accept via its square-sided tubing 118 virtually any suitably terminated alternate tool head types.

The tool expanding assembly 110 comprises a metallic, square-sided, hollow tubular member 118 which is permanently secured to the open-sided cylinder 14 along a longitudinal line (analogous to the line B-B' of FIG. 2) as by spot welding. A latching device 136 is positioned in the tool user end of the member 118, and is retained by coil spring/pin assembly 138. The latching device 136 includes a finger engageable release tab 140 which is accessible from an opening in the lower side of the member 118. The alternate tool head 116 includes a short, square-sided shaft member 128, a triangular locking notch 142, and a thick rubber grommet 144. In use, the quick-connect portion 118, alternately called the square-sided tubular member 118, receives the shaft member 128 within it, and the latching device 136 retains the two members firmly interconnected by engaging the locking notch 142 under the urging of the spring assembly 138. The rubber grommet 144 serves to apply a resilient pressure loading which maintains a tight fit of the latching device 136, and absorbs jarring during tool usage. When it is desired to change the type of alternate tool head being paired with the mother tool, the release tab 140 is actuated, allowing the shaft member 128 to be removed from the tool expanding assembly 110. Thereafter, other suitably terminated tool heads may be quickly inserted to meet the changing needs of the tool user.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

What is claimed is:

1. A garden tool expanding assembly for providing a quick interconnect capability of the shaped shaft of an alternate tool head to the handle of a mother tool, comprising:
   (a) a first open-sided cylindrical quick-connect member for attaching to said mother tool handle;
   (b) a second uniformly cross-sectioned tubular quick-connect member for accepting said alternate tool head shaped shaft;
   (c) said first member having at least one fastening means for circumferentially retaining said open-sided cylindrical member around said handle, and said second member cooperating with said shaped shaft to provide at lest one spring loaded locking means for longitudinally retaining said shaped shaft within said tubular member;
   (d) said first and second members rigidly connected along a longitudinal axis with the open-sided portion of said first member circumferentially displaced from said axis; and
   (e) whereby said tool expanding assembly allows readily interchangeable use of the mother tool type and any one of a variety of alternate tool head types affixed to a suitably shaped shaft.

2. The tool expanding assembly of claim 1 wherein said uniformly cross-sectioned tubular member is circular and said shaped shaft is cylindrically shaped to fit within said circular tubular member.

3. The tool expanding assembly of claim 2 wherein said fastening means include one or more nut and bolt pairs carried by longitudinal flanges formed along the open edges of said open-sided cylindrical member to retain said open-sided cylindrical member around said mother tool handle under compression.

4. The tool expanding assembly of claim 2 wherein said fastening means include a lever-actuated hook and loop assembly.

5. The tool expanding assembly of claim 2 wherein said spring loaded locking means is of the bayonet type having a shaped slot formed into one end of said circular tubular member and a pin rigidly positioned along said cylindrically shaped shaft whereby upon insertion said shaft is locked into said tubular member by said pin engaging said shaft under the urging of a coil spring affixed around such shaft.

6. The tool expanding assembly of claim 1 wherein said uniformly cross-sectioned tubular member is square and said shaped shaft is square shaped to fit within said square tubular member.

7. The tool expanding assembly of claim 6 wherein said fastening means include one or more nut and bolt pairs carried by longitudinal flanges formed along the open edges of said open-sided cylindrical member to retain said member around said mother tool handle under compression.

8. The tool expanding assembly of claim 6 wherein said fastening means include a lever-actuated hook and loop assembly.

9. The tool expanding assembly of claim 6 wherein said spring-loaded locking member is of the notch and latch type having a right triangular-shaped notch formed into one end of said square shaft and a spring-loaded latch member positioned at one end of said square tubular member, whereby upon insertion said shaft is locked within said tubular member by engagement of said latch member within said triangular notch.

10. A method of rapidly expanding the utility of an existing garden tool by providing rapidly insertable alternate tool heads into a coupling device which is in turn rapidly affixed to the garden tool handle, comprising the steps of:
    (a) providing a two section coupling device for rapid attachment to a handle of the existing tool by a first section, and for rapidly accepting alternate tool head types by a second section;
    (b) providing an open sided cylindrical member for fitting around said handle as said first section, said open-sided cylindrical member having at least one fastening means for circumferentially restraining said handle/member pair under compression;
    (c) providing an elongated tubular member for accepting shaped shafts carrying alternate tool head types as said second section, said elongated tubular member cooperating with said shaped shaft to provide at least one spring loaded locking means for longitudinally retaining such shaped shaft within said tubular member;
    (d) permanently connecting said open sided cylindrical member and said elongated tubular member along a longitudinal axis; and
    (e) thereby permitting ready access to a plurality of tool types in groups of two, including the mother tool type and any other one of a variety of alternate tool head types.

11. The method of claim 10 including the further step of providing a circular cross-sectioned member as said elongated tubular member and of providing a cylindrically shaped shaft of smaller diameter than said circular cross-sectioned member, whereby said shaft may be rapidly inserted into said member.

12. The method of claim 11 including the further step of forming flanges along the open longitudinal edges of said open-sided circular member, whereby said open-sided circular member may be rapidly fitted around said handle and retained in position by said fastening means.

13. The method of claim 12 including the further step of providing at least one nut and bolt pair as said fastening means and of inserting said nut and bolt pair through said flanges, whereby said retained open-sided circular member may be securely retained by tightening said nut and bolt pair.

14. The method of claim 13 including the further step of providing a bayonet-type connector as said locking means, said bayonet-type connector including a shaped slot formed into one end of said circular tubular member and a pin rigidly positioned along said cylindrically shaped shaft whereby said cylindrically shaped shaft may be rapidly inserted into said circular cross-sectioned member.

15. The method of claim 10 including the further step of providing at least one hook and loop pair as said fastening means, whereby upon opening said hook and loop pair said open-sided circular member may rapidly fitted around said handle and upon engaging said hook with said loop said retained open-sided cylindrical member may be rapidly retained securely.

16. The method of claim 10 including the further step of providing a square cross-sectioned member as said elongated tubular member and of providing a square shaped shaft of smaller width than said square cross-sectioned member, whereby said shaft may be rapidly inserted into said member.

17. The method of claim 16 including the further step of forming flanges along the open longitudinal edges of said open-sided cylindrical member, whereby said open-sided cylindrical member may be rapidly fitted around said handle and retained in position by said fastening means.

18. The method of claim 17 including the further step of providing at least one nut and bolt pair as said fastening means and of inserting said nut and bolt pair through said flanges, whereby said retained open-sided circular member may be securely retained by tightening said nut and bolt pair.

19. The method of claim 16 including the further step of providing at least one hook and loop pair as said fastening means, whereby upon opening said hook and loop pair said open-sided cylindrical member may be rapidly fitted around said handle and upon engaging said hook with said loop said retained open-sided cylindrical member may be rapidly retained securely.

* * * * *